(12) United States Patent
Li et al.

(10) Patent No.: US 12,494,083 B2
(45) Date of Patent: Dec. 9, 2025

(54) METHOD AND APPARATUS WITH FACE RECOGNITION

(71) Applicant: Samsung Electronics Co., Ltd., Suwon-si (KR)

(72) Inventors: Hui Li, Xi'an (CN); Jiguang Xue, Xi'an (CN); Jaejoon Han, Seoul (KR); Seon Min Rhee, Seoul (KR); Seungju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 17/695,241

(22) Filed: Mar. 15, 2022

(65) Prior Publication Data

US 2022/0301342 A1    Sep. 22, 2022

(30) Foreign Application Priority Data

Mar. 16, 2021   (CN) .......................... 202110282834.6
Feb. 10, 2022   (KR) .......................... 10-2022-0017234

(51) Int. Cl.
  *G06V 40/16*        (2022.01)
  *G06T 7/246*        (2017.01)

(52) U.S. Cl.
  CPC .......... *G06V 40/172* (2022.01); *G06T 7/248* (2017.01); *G06V 40/169* (2022.01); *G06V 40/171* (2022.01); *G06T 2207/30201* (2013.01)

(58) Field of Classification Search
  CPC .. G06V 40/172; G06V 40/168; G06V 40/169; G06V 40/171; G06T 7/248; G06T 2207/30201
  See application file for complete search history.

(56) References Cited

U.S. PATENT DOCUMENTS

2018/0341860 A1   11/2018  Shazeer et al.
2020/0242153 A1   7/2020   Luo et al.
(Continued)

FOREIGN PATENT DOCUMENTS

CN    101510257 A    8/2009
CN    109543606 A    3/2019
(Continued)

OTHER PUBLICATIONS

Li, Yong, et al. "Occlusion Aware Facial Expression Recognition Using CNN With Attention Mechanism." IEEE Transactions on Image Processing 28.5 (2019): 2439-2450.
(Continued)

*Primary Examiner* — Margaret G Webb
(74) *Attorney, Agent, or Firm* — NSIP Law

(57) ABSTRACT

A method with face recognition includes: determining a first global feature of a first face image and a first global feature of a second face image based on a local feature of the first face image and a local feature of the second face image, respectively; determining a final global feature of the first face image based on the first global feature of the first face image and a second global feature of the first face image; determining a final global feature of the second face image based on the first global feature and a second global feature of the second face image; and recognizing the first face image and the second face image based on the final global feature of the first face image and the final global feature of the second face image, wherein the second global feature of the first face image is determined based on the local feature of the first face image, and the second global feature of the second face image is determined based on the local feature of the second face image.

16 Claims, 6 Drawing Sheets

(56) References Cited

U.S. PATENT DOCUMENTS

| | | | |
|---|---|---|---|
| 2021/0034840 A1* | 2/2021 | Fan | G06V 20/46 |
| 2021/0248761 A1* | 8/2021 | Liu | G06N 3/045 |
| 2022/0310070 A1* | 9/2022 | Moritz | G10L 15/28 |
| 2023/0095182 A1* | 3/2023 | Yao | G06V 40/40 |
| | | | 382/115 |
| 2023/0293079 A1* | 9/2023 | Chen | G06V 10/25 |

FOREIGN PATENT DOCUMENTS

| | | |
|---|---|---|
| CN | 109934197 A | 6/2019 |
| CN | 110192206 A | 8/2019 |
| CN | 110705353 A | 1/2020 |
| CN | 110956060 A | 4/2020 |
| CN | 111241961 A | 6/2020 |
| CN | 112037254 A | 12/2020 |
| CN | 112070670 A | 12/2020 |
| CN | 112149459 A | 12/2020 |
| CN | 109145765 B | 1/2021 |
| CN | 112101358 B | 2/2021 |
| KR | 10-2020-0029659 A | 3/2020 |
| KR | 10-2132690 B1 | 7/2020 |
| KR | 10-2205430 B1 | 1/2021 |
| KR | 10-2213478 B1 | 2/2021 |

OTHER PUBLICATIONS

Chinese Office Action issued on Sep. 1, 2023, in counterpart Chinese Patent Application No. 202110282834.6 (13 pages in English, 9 pages in Chinese).

* cited by examiner

METHOD AND APPARATUS WITH FACE RECOGNITION

CROSS-REFERENCE TO RELATED APPLICATIONS

This application claims the benefit under 35 USC § 119(a) of Chinese Patent Application No. 202110282834.6 filed on Mar. 16, 2021 in the China National Intellectual Property Administration, and Korean Patent Application No. 10-2022-0017234 filed on Feb. 10, 2022 in the Korean Intellectual Property Office, the entire disclosures of which are incorporated herein by reference for all purposes.

BACKGROUND

1. Field

The following disclosure relates to a method and apparatus with face recognition.

2. Description of Related Art

Face recognition technology may be variously applied in daily life, such as phone unlocking, video surveillance, online payment, access control, and photo album management.

Face recognition technology may be used to design an effective network structure and construct a discriminant loss function for feature learning, to obtain a trained network and execute face recognition. By using deep neural network technology and available large-scale face data sets, the accuracy of face recognition may be greatly enhanced. Examples of face recognition typically include DeepFace, DeepID, FaceNet, DeepFR, InsightFace, MobileFace, and the like.

In typical face recognition methods, global features are generally extracted from the entire face image through a properly designed convolutional neural network (CNN). For example, to determine whether a given pair of face images has the same identity, facial expressions of the two face images may be obtained by inputting the face images to a trained CNN classifier and compared and whether the facial expressions indicate the same person is determined. Since CNN parameters are trained and then fixed, representations of compared face images obtained through a trained CNN may remain fixed regardless of which face image is to be compared with the compared face images. To discriminate the compared face images from the other face images, sufficient discrimination may be required to represent a face image, but it may be difficult to obtain such sufficient discrimination. To sufficiently distinguish between representations of face images, a similarity between paired images may be calculated through a comparator network. However, such a method is quite cumbersome because it is necessary to first detect face feature points for a feature point-based feature comparison. In addition, to increase the accuracy of face recognition, different features between pairs of face images may be extracted through a contrasting convolution mechanism. However, such a method ignores an action of similar features between compared face pairs, especially when two face images come from the same identity. In addition, an attention mechanism may be used to enhance the accuracy of face recognition. However, a typical method of increasing an accuracy of face recognition through a self-attention mechanism still has an issue in fixing representations of compared face images, and still ignores an action of similar features between the compared image pairs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with face recognition includes: determining a first global feature of a first face image and a first global feature of a second face image based on a local feature of the first face image and a local feature of the second face image, respectively; determining a final global feature of the first face image based on the first global feature of the first face image and a second global feature of the first face image; determining a final global feature of the second face image based on the first global feature and a second global feature of the second face image; and recognizing the first face image and the second face image based on the final global feature of the first face image and the final global feature of the second face image, wherein the second global feature of the first face image is determined based on the local feature of the first face image, and the second global feature of the second face image is determined based on the local feature of the second face image.

The determining of the first global feature of the first face image and the first global feature of the second face image based on the local feature of the first face image and the local feature of the second face image, respectively, may include performing an attention pooling processing based on the local feature of the first face image and the local feature of the second face image to determine the first global feature of the first face image and the first feature of the second face image, respectively.

The local feature of the first face image may be a local feature of the first face image in which position information is embedded, and the local feature of the second face image may be a local feature of the second face image in which position information is embedded.

The performing of the attention pooling processing based on the local feature of the first face image and the local feature of the second face image to determine the first global feature of the first face image and the first global feature of the second face image, respectively, may include: determining a first attention pooling feature of the first face image with respect to the second face image and a second attention pooling feature of the second face image with respect to the first face image, based on the local feature of the first face image and the local feature of the second face image, respectively, using a multi-head attention mechanism; determining the first global feature of the first face image based on the first attention pooling feature; and determining the first global feature of the second face image based on the second attention pooling feature.

The determining of the first attention pooling feature of the first face image with respect to the second face image and the second attention pooling feature of the second face image with respect to the first face image using the multi-head attention mechanism, based on the local feature of the first face image and the local feature of the second face image may include: determining a first query vector by multiplying the local feature of the second face image by a first query matrix corresponding to a query, determining a first key vector by multiplying the local feature of the first face image by a first key matrix corresponding to a key, determining a first value vector by multiplying the local feature of the first face image by a first value matrix corresponding to a value, and determining an attention pooling feature of the first face image with respect to the second face image based on the determined first query vector, the determined first key vector and the determined first value vector; and determining a second query vector by multiplying the local feature of the first face image by a second query matrix corresponding to a query, determining a second key vector by multiplying the local feature of the second face image by a second key matrix corresponding to a key, determining a second value vector by multiplying the local feature of the second face image by a second value matrix corresponding to a value, and determining the second attention pooling feature of the second face image with respect to the first face image based on the determined second query vector, the determined second key vector and the determined second value vector.

The determining of the first global feature of the first face image and the first global feature of the second face image may include determining the first global feature of the first face image and the first global feature of the second face image, respectively, using a same network or different networks.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with face recognition includes: a first global feature obtaining module configured to determine a first global feature of a first face image and a first global feature of a second face image based on a local feature of the first face image and a local feature of the second face image, respectively; a final global feature obtaining module configured to determine a final global feature of the first face image based on the first global feature and a second global feature of the first face image and determine a final global feature of the second face image based on the first global feature and a second global feature of the second face image; and a recognition module configured to recognize the first face image and the second face image based on the final global feature of the first face image and the final global feature of the second face image, wherein the second global feature of the first face image is determined based on the local feature of the first face image, and the second global feature of the second face image is determined based on the local feature of the second face image.

For the determining of the first global feature of the first face image and the first global feature of the second face image, the first global feature obtaining module may be configured to perform an attention pooling processing based on the local feature of the first face image and the local feature of the second face image to determine the first global feature of the first face image and the first global feature of the second face image, respectively.

The local feature of the first face image may be a local feature of the first face image in which position information is embedded, and the local feature of the second face image may be a local feature of the second face image in which position information is embedded.

For the determining of the first global feature of the first face image and the first global feature of the second face image, the first global feature obtaining module may be configured to: determine a first attention pooling feature of the first face image with respect to the second face image and a second attention pooling feature of the second face image with respect to the first face image, based on the local feature of the first face image and the local feature of the second face image, respectively, using a multi-head attention mechanism; determine the first global feature of the first face image based on the first attention pooling feature; and determine the first global feature of the second face image based on the second attention pooling feature.

The first global feature obtaining module may include a cross-attention module, and for the determining of the first attention pooling feature of the first face image and the second attention pooling feature of the second face image, the cross-attention module may be configured to: determine a first query vector by multiplying the local feature of the second face image by a first query matrix corresponding to a query, determine a first key vector by multiplying the local feature of the first face image by a first key matrix corresponding to a key, determine a first value vector by multiplying the local feature of the first face image by a first value matrix corresponding to a value, and determine the first attention pooling feature of the first face image with respect to the second face image based on the determined first query vector, the determined first key vector and the determined first value vector; and determine a second query vector by multiplying the local feature of the first face image by a second query matrix corresponding to a query, determine a second key vector by multiplying the local feature of the second face image by a second key matrix corresponding to a key, determine a second value vector by multiplying the local feature of the second face image by a second value matrix corresponding to a value, and determine the second attention pooling feature of the second face image with respect to the first face image based on the determined second query vector, the determined second key vector and the determined second value vector.

The global feature obtaining module may include: a first face image first global feature determining module configured to determine the first global feature of the first face image; and a second face image first global feature determining module configured to determine the first global feature of the second face image.

In another general aspect, an electronic device includes: one or more processors configured to: determine a first global feature of a first face image and a first global feature of a second face image based on a local feature of the first face image and a local feature of the second face image, respectively, determine a final global feature of the first face image based on the first global feature and a second global feature of the first face image, determine a final global feature of the second face image based on the first global feature and a second global feature of the second face image, and recognize the first face image and the second face image based on the final global feature of the first face image and the final global feature of the second face image, wherein the second global feature of the first face image is determined based on the local feature of the first face image, and the second global feature of the second face image is determined based on the local feature of the second face image.

For the determining of the first global feature of the first face image and the first global feature of the second face image, the one or more processors may be configured to perform an attention pooling processing based on the local feature of the first face image and the local feature of the second face image to determine the first global feature of the first face image and the first global feature of the second face image, respectively.

The local feature of the first face image may be a local feature of the first face image in which position information is embedded, and the local feature of the second face image may be a local feature of the second face image in which position information is embedded.

For the determining of the first global feature of the first face image and the first global feature of the second face image, the one or more processors may be configured to: determine a first attention pooling feature of the first face image with respect to the second face image and a second attention pooling feature of the second face image with respect to the first face image, based on the local feature of the first face image and the local feature of the second face image, respectively, using a multi-head attention mechanism; determine the first global feature of the first face image based on the first attention pooling feature; and determine the second global feature of the second face image based on the second attention pooling feature.

For the determining of the first attention pooling feature of the first face image and the second attention pooling feature of the second face image, the one or more processors may be configured to: determine a first query vector by multiplying the local feature of the second face image by a first query matrix corresponding to a query, determine a first key vector by multiplying the local feature of the first face image by a first key matrix corresponding to a key, determine a first value vector by multiplying the local feature of the first face image by a first value matrix corresponding to a value, and determine the first attention pooling feature of the first face image with respect to the second face image based on the determined first query vector, the determined first key vector and the determined first value vector; and determine a second query vector by multiplying the local feature of the first face image by a second query matrix corresponding to a query, determine a second key vector by multiplying the local feature of the second face image by a second key matrix corresponding to a key, determine a second value vector by multiplying the local feature of the second face image by a second value matrix corresponding to a value, and determine the second attention pooling feature of the second face image with respect to the first face image based on the determined second query vector, the determined second key vector and the determined second value vector.

The apparatus may include a memory storing instructions that, when executed by the one or more processors, configure the one or more processors to perform the determining of the first global feature of the first face image and the first global feature of the second face image, the determining of the final global feature of the first face image, the determining of the final global feature of the second face image, and the recognizing of the first face image and the second face image.

Other features and aspects will be apparent from the following detailed description, the drawings, and the claims.

Figure 1:
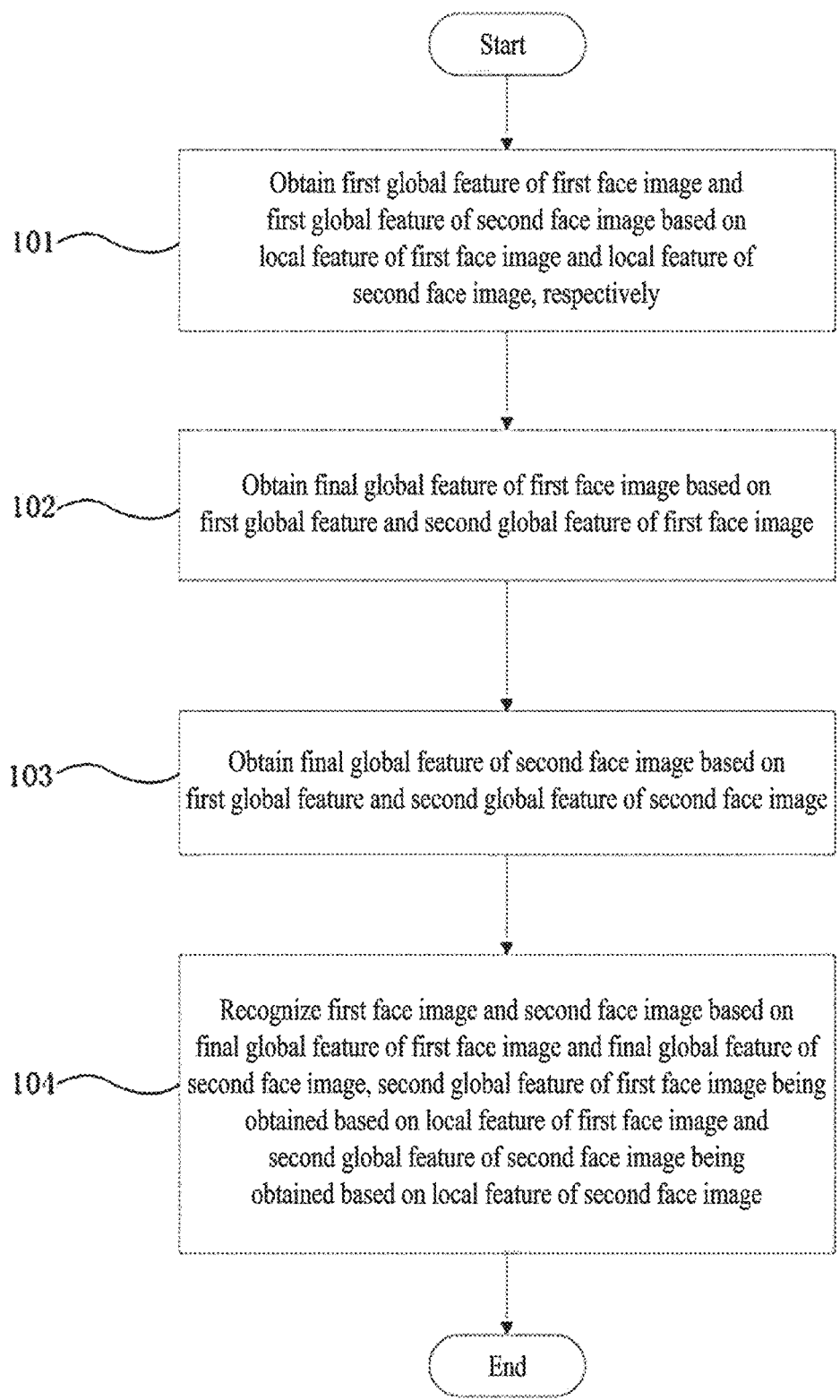
FIG. 1 illustrates an example of a face recognition method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first," "second," and the like are used to explain various members, components, regions, layers, or sections, these members, components, regions, layers, or sections are not limited to such terms. Rather, these terms are used only to distinguish one member, component, region, layer, or section from another member, component, region, layer, or section. For example, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

To facilitate interpretation of the examples, a method of representing a local feature of a face image will first be described. It will be understood, after an understanding of the present disclosure, that a local feature of a face described herein represents a local feature map or a local feature representation of a face image and may be expressed in a form of, for example, a matrix.

In an example, the local feature representation of the face image may be obtained using a convolutional network.

In an example, a local feature of a face image may be extracted using ResNet as a backbone network. For example, in a face image with a size of 112×112, a feature map output from a last layer of a convolutional network may have a size of C×7×7 (C is a channel size, for example, "C=512"). In addition, a feature map with a size of C×7×7 may be processed as a feature map with a size of C×5×5 using another convolution layer.

For example, the feature map having the size of C×5×5 may be directly obtained through a convolutional network. After a convolution process, the face image may be divided into 5×5 sub-regions, so that the face image may be described using the feature map having the size of C×5×5.

In addition, a global feature or a global feature representation of the face image may be obtained by inputting the obtained local feature to a fully connected layer (e.g., one or more fully connected layers).

It will be understood, after an understanding of the present disclosure, that a global feature described herein represents a global feature representation of a face image or a feature map of the entire image and may be expressed in a form of, for example, a matrix.

FIG. 1 is a flowchart illustrating an example of a face recognition method (or face verification). A face recognition method and apparatus of one or more embodiments may increase an accuracy of face recognition based on an influence of similar features between pairs of comparative face images.

Referring to FIG. 1, in operation 101, a face recognition apparatus (or face authentication apparatus) may obtain a first global feature of a first face image and a first global feature of a second face image based on a local feature of the first face image and a local feature of the second face image, respectively.

In an example, the face recognition apparatus may obtain the first global feature of the first face image and the first global feature of the second face image, using the same network. In another example, the face recognition apparatus may obtain the first global feature of the first face image using a first network, and obtain the first global feature of the second face image using a second network. The first network and the second network may be the same or different.

The face recognition apparatus may save software/hardware overhead by obtaining a first global feature of a face image through the same network, and may increase a face recognition speed by obtaining the first global feature of the first face image and the first global feature of the second face image through two networks.

In an example, the obtaining of the first global feature of the first face image and the first global feature of the second face image based on the local feature of the first face image and the local feature of the second face image may include performing an attention pooling processing based on the local feature of the first face image and the local feature of the second face image to obtain the first global feature of the first face image and the first global feature of the second face image, respectively.

In an example, the local feature of the first face image may be a local feature of the first face image in which position information is embedded, and the local feature of the second face image may be a local feature of the second face image in which position information is embedded. For example, the face recognition apparatus may embed position information in the local feature of the first face image to obtain the local feature of the first face image in which the position information is embedded, and embed position information in the local feature of the second face image to obtain the local feature of the second face image in which the position information is embedded. Hereinafter, a non-limiting example of an attention pooling operation will be described in detail with reference to FIG. 2.

Figure 2:
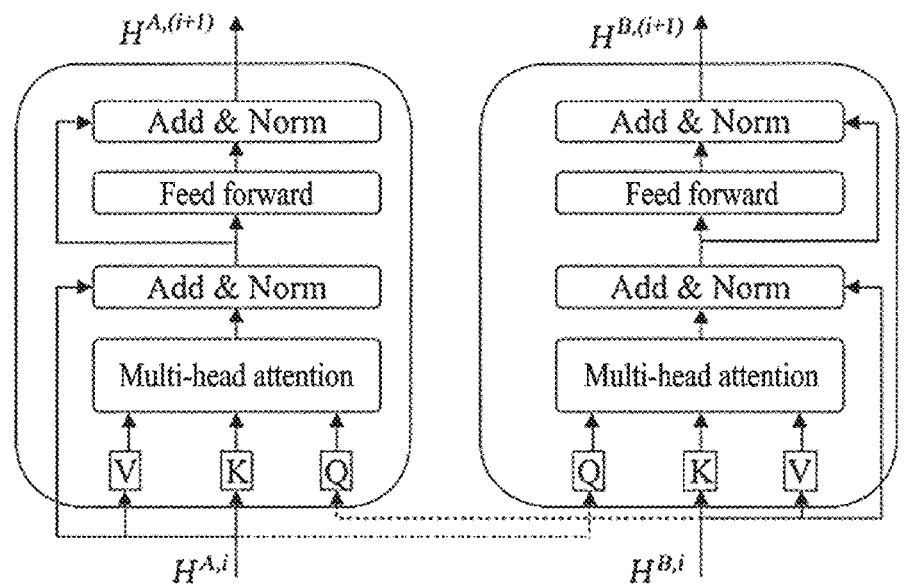
FIG. 2 illustrates an example of performing an attention pooling processing on a local feature of a first face image and a local feature of a second face image based on a cross attention mechanism.

FIG. 2 illustrates an example of performing an attention pooling processing on a local feature of a first face image and a local feature of a second face image based on a cross attention mechanism.

Referring to FIG. 2, a face recognition apparatus may input a local feature $H^{A,i}$ of a face image A (hereinafter, also referred to as a first face image or image A) in which position information is embedded and a local feature $H^{B,i}$ of a face image B (hereinafter, also referred to as a second face image or image B) in which position information is embedded to a left multi-head attention module to obtain an attention pooling feature of the first face image with respect to the second face image, and may input the local feature of the first face image with the embedded position information and the local feature of the second face image with the embedded position information to a right multi-head attention module to obtain an attention pooling feature of the second face image with respect to the first face image.

In an example, the face recognition apparatus may obtain the attention pooling feature of the first face image with respect to the second face image through a multi-head attention layer of a left attention block, and may obtain the attention pooling feature of the second face image with respect to the first face image through a multi-head attention layer of a right attention block.

In an example, the face recognition apparatus may process the attention pooling feature of the first face image with respect to the second face image through each subsequent layer of the left attention block, and may input a processing result to a first fully connected layer, to obtain a first global feature of the first face image.

In an example, the face recognition apparatus may process the attention pooling feature of the second face image with respect to the first face image through each subsequent layer of the right attention block, and may input a processing result to a second fully connected layer, to obtain a first global feature of the second face image. The first fully connected layer and the second fully connected layer may be the same fully connected layer, or may be two independent fully connected layers.

The left multi-head attention block and the right multi-head attention block may have the same structure as a multi-head attention block (or a standard transformer block). For example, each of the left multi-head attention block and the right multi-head attention block may include a multi-head attention layer, a residual connection and layer normalization (Add&Norm) layer, and a feed forward layer, and may calculate an attention based on a multi-head attention mechanism.

In the case of a typical multi-head attention block based on a self-attention mechanism, a query vector, a key vector, and a value vector input to the multi-head attention layer may all correspond to local features of an image itself. In other words, in the case of the typical multi-head attention block based on the self-attention mechanism, a query vector Q, a key vector K, and a value vector V may be obtained by multiplying matrices $W^q$, $W^k$, and $W^{vq}$ by a local feature representation of a face image, respectively.

In other words, in obtaining of a pooling feature of a first face image based on the typical self-attention mechanism, an obtained pooling feature of a first face image may be associated with the local feature of the first face image with the embedded position information, instead of a local feature of a comparative face image (e.g., a second face image). That is, an obtained pooling feature of a corresponding image may be fixed regardless of a face image to be compared.

In contrast, in an example of one or more embodiments, a query vector input to the multi-head attention layer may correspond to the local feature of the comparative image (e.g., the second face image), instead of corresponding to the local feature of the first face image itself. That is, a query vector input to the multi-head attention layer of the left multi-head attention module may correspond to the local feature of the second face image, and a query vector input to the multi-head attention layer of the right multi-head attention module may correspond to the local feature of the first face image. In other words, the face recognition apparatus of one or more embodiments may obtain a pooling feature of the first face image and a pooling feature of the second face image based on a cross-attention mechanism.

As described above, it will be understood, after an understanding of the present disclosure, that a method of obtaining a pooling feature of a face based on a cross-attention mechanism according to one or more embodiments differs from a typical method of obtaining a pooling feature of a face image based on an attention mechanism, in that when the attention pooling feature of the first face image is obtained, a Q vector input to the multi-head attention layer corresponds to the local feature of the second face image with the embedded position information, and in that when the attention pooling feature of the second face image is obtained, a Q vector input to the multi-head attention layer corresponds to the local feature of the first face image with the embedded position information. In contrast, when an attention pooling feature of a first face image is obtained based on the typical self-attention mechanism, a Q vector input to a multi-head attention layer corresponds to a local feature of the first face image, and when an attention pooling feature of a second face image is obtained based on the self-attention mechanism, a Q vector input to a multi-head attention layer corresponds to a local feature of the second face image.

In other words, according to an example, the face recognition apparatus of one or more embodiments may be based on the local feature of the first face image with the embedded position information and the local feature of the second face image with the embedded position information, and may obtain a first attention pooling feature of the first face image with respect to the second face image and a second attention pooling feature of the second face image with respect to the first face image, respectively, using the multi-head attention mechanism.

In an example, the face recognition apparatus may obtain a first query vector by multiplying the local feature of the second face image by a first query matrix corresponding to a query, obtain a first key vector by multiplying the local feature of the first face image by a first key matrix corresponding to a key, obtain a first value vector by multiplying the local feature of the first face image by a first value matrix corresponding to a value, and obtain an attention pooling feature (hereinafter, also referred to as a "first attention pooling feature") of the first face image with respect to the second face image based on the obtained first query vector, the obtained first key vector and the obtained first value vector. The face recognition apparatus may obtain a second query vector by multiplying the local feature of the first face image by a second query matrix corresponding to a query, obtain a second key vector by multiplying the local feature of the second face image by a second key matrix corresponding to a key, obtain a second value vector by multiplying the local feature of the second face image by a second value matrix corresponding to a value, and obtain an attention pooling feature (hereinafter, also referred to as a "second attention pooling feature") of the second face image with respect to the first face image based on the obtained second query vector, the obtained second key vector and the obtained second value vector.

It will be understood, after an understanding of the present disclosure, that when the first attention pooling feature and the second attention pooling feature are each obtained through the same network, a matrix modified by "first" is identical to a matrix modified by "second". For example, the first query matrix and the second query matrix may be the same.

For example, when the first attention pooling feature and the second attention pooling feature are obtained through two independent networks, a matrix modified by "first" is different from a matrix modified by "second". For example, the first query matrix and the second query matrix may be different from each other.

In another example, when the first attention pooling feature and the second attention pooling feature are each obtained through two independent networks, the matrix modified by "first" and the matrix modified by "second" may be the same. For example, the first query matrix and the second query matrix may be the same.

For convenience of interpretation, a local feature of an image may be processed in a size of 5×5, processed through feature rearrangement, represented in a size of 1×25, and then input to the multi-head attention block of FIG. 2.

In an example, the face recognition apparatus may obtain a local feature map of the image A having a size of 5×55 through a convolutional neural network (CNN), and process the local feature map of the image A through feature rearrangement, to obtain a local feature map expressed as $\{v_1, v_2, \ldots v_{25}\}$, $v_i \in R^C$. Subsequently, the face recognition apparatus may obtain a local feature $H^{A,i} = \{h_1^A, h_2^A, \ldots, h_{25}^A\}$ of the image A in which position information is embedded by embedding $\{v_1, v_2, \ldots v_{25}\}$ in the position information corresponding to the local feature. Similarly, the face recognition apparatus may obtain a local feature $H^{B,i} = \{h_1^B, h_2^B, \ldots, h_{25}^B\}$ of the image B.

Referring to FIG. 2, the local feature $H^{A,i} = \{h_1^A, h_2^A, \ldots, h_{25}^A\}$ of the image A and the local feature $H^{B,i} = \{h_1^B, h_2^B, \ldots, h_{25}^B\}$ of the image B may be input to the left attention module, and an attention pooling feature of the image A with respect to the image B.

For example, the face recognition apparatus may obtain a key vector $K^A$ and a value vector $V^A$ by multiplying $H^{A,i} = \{h_1^A, h_2^A, \ldots, h_{25}^A\}$ by matrices $W^k$ and $W^v$, respectively, obtain a query vector $Q^B$ by multiplying $H^{B,i} = \{h_1^B, h_2^B, \ldots, h_{25}^B\}$ by a matrix $W^q$, input the obtained key vector $K^A$, the obtained value vector $V^A$ and the obtained query vector $Q^B$ (corresponding to K, V and Q of the left attention block in sequence) to the multi-head attention layer of the left attention module and process the key vector $K^A$, the value vector $V^A$ and the query vector $Q^B$ to obtain the attention pooling feature of the image A with respect to the image B. Through processing of another layer of the left attention block, a local feature representation of the image A based on the cross-attention mechanism may be obtained.

It will be understood, after an understanding of the present disclosure, that a local representation of an image input to the left attention block is for obtaining a local feature (hereinafter, referred to as a "first local feature" for convenience of description) of the image based on the image itself. For example, the face recognition apparatus may obtain a local feature (that is, the first local feature of the image A) of the image A based on the image A through a convolutional network, and obtain a local feature (that is, the first local feature of the image B) of the image B based on the image B through the convolutional network. A local feature $H^{A,(i+1)}$ output through processing of the left attention block may be a local feature representation (hereinafter, referred to as a "second local feature of the image A" for convenience of description) based on the cross-attention mechanism of the image A obtained based on the first local feature of the image A and the first local feature of the image B.

Similarly, the face recognition apparatus may input a local feature representation $H^{B,i} = \{h_1^B, h_2^B, \ldots, h_{25}^B\}$ (the first local feature of the image B) of the image B and a local feature representation $H^{A,i} = \{h_1^A, h_2^A, \ldots, h_{25}^A\}$ of the image A to the right attention module to obtain an attention pooling feature of the image B with respect to the image A. For example, the face recognition apparatus may obtain a key vector $K^B$ and a value vector $V^B$ by multiplying $H^{B,i} = \{h_1^B, h_2^B, \ldots, h_{25}^B\}$ by matrices $W^k$ and $W^v$, respectively, obtain a query vector $Q^A$ by multiplying $H^{A,i} = \{h_1^A, h_2^A, \ldots, h_{25}^A\}$ by a matrix $W^q$, input the obtained key vector $K^B$, the obtained value vector $V^B$ and the obtained query vector $Q^A$ (sequentially corresponding to K, V and Q of the right attention block) to the multi-head attention layer of the right attention module and process the key vector $K^B$, the value vector $V^B$ and the query vector $Q^A$ to obtain the attention pooling feature of the image B with respect to the image A. Through processing of another layer of the right attention block, a local feature $H^{B,(i+1)}$ representation of the image B (also referred to as a second local feature of the image B) based on the cross-attention mechanism may be obtained.

In an example, an output of the left multi-head attention layer and an output of one head of the right multi-head attention layer of FIG. 2 may be expressed as shown in Equation 1 below, for example.

$$\begin{cases} Attn(Q^B, K^A, V^A) = \text{softmax}\left(\dfrac{Q^B(K^A)^T}{\sqrt{d}}\right)V^A \\ Attn(Q^A, K^B, V^B) = \text{softmax}\left(\dfrac{Q^A(K^B)^T}{\sqrt{d}}\right)V^B \end{cases} \quad \text{Equation 1}$$

In Equation 1, d denotes a scale factor.

In an example, $H^{A,i} = \{h_1^A, h_2^A, \ldots, h_{25}^A\}$ may represent a first local feature representation of the image A in which position information is embedded, and $H^{B,i} = \{h_1^B, h_2^B, \ldots, h_{25}^B\}$ may represent a first local feature representation of the image B in which position information is embedded.

In an example, the face recognition apparatus may perform position coding on a local feature of a face image based on a sine function and a cosine function to obtain the local feature of the face image in which position information is embedded.

The face recognition apparatus may use any number of position coding methods to embed position information and obtain a local feature of a face image in which the position information is embedded.

In an example, a local feature expression of the face image in which the position information is embedded may be expressed as shown in Equation 2 below, for example.

$$h_k = W_v v_k + W_p p_k \quad \text{Equation 2:}$$

In Equation 2 above, $v_k$ and $p_k$ denote a local feature element and a position embedding element of a face image, respectively, $k=1, 2, \ldots, 25$, and $W_v$ and $W_p$ denote a weight corresponding to the local feature element and a weight corresponding to the position embedding element, respectively.

In another example, a first local feature of a face image input to the multi-head attention block may be a local feature of a face on which position coding or position embedding is not performed. That is, the local feature input to the multi-head attention block may be $\{v_1, v_2, \ldots, v_{25}\}$, $v_i \in R^C$. For example, the face recognition apparatus may obtain a second local feature $H^{A,(i+1)}$ of the first face image based on an attention pooling feature (that is, an output of the left attention module) of the first face image with respect to the second face image. The face recognition apparatus may obtain a second local feature $H^{B,(i+1)}$ of the second face image based on an obtained attention pooling feature (that is, an output of the left attention module) of the second face image with respect to the first face image.

For example, in the left multi-head attention block, the face recognition apparatus may obtain an attention pooling feature of the image A with respect to the image B through the multi-head attention layer, and may finally output a second local feature of the image A through processing of a subsequent layer of the multi-head attention block.

For example, a parameter of the left attention block and a parameter of the right attention block may be the same or different.

Although two multi-head attention blocks are shown in FIG. 2, the face recognition apparatus may perform an attention pooling processing on the first face image and the second face image, respectively, using one multi-head attention block.

In an example, the face recognition apparatus may obtain the attention pooling feature of the image A and the attention pooling feature of the image B using the multi-head attention block. For example, the face recognition apparatus may first obtain the attention pooling feature of the image A with respect to the image B through the multi-head attention block, and may obtain the attention pooling feature of the image B with respect to the image A.

As described above, the face recognition apparatus may obtain the first attention pooling feature of the first face image with respect to the second face image and the second attention pooling feature of the second face image with respect to the first face image using the multi-head attention mechanism, based on the local feature of the first face image and the local feature of the second face image, respectively.

When an attention pooling feature of a face image is obtained, the face recognition apparatus may further obtain a first global feature of the face image.

In an example, the face recognition apparatus may obtain a first global feature of the image A by inputting the second local feature $H^{A,(i+1)}$ of the image A to a fully connected layer. Since the second local feature $H^{A,(i+1)}$ of the image A is obtained based on the cross-attention mechanism, the first global feature of the image A may reflect a correlation between the images A and B.

Similarly, the face recognition apparatus may obtain a first global feature of the image B by inputting the second local feature $H^{B,(i+1)}$ of the image B to a fully connected layer. Since the second local feature $H^{B,(i+1)}$ of the image B is obtained based on the cross-attention mechanism, the first global feature of the image B may reflect the correlation between images A and B.

Returning back to FIG. 1, in operation 102, the face recognition apparatus may obtain a final global feature of the first face image based on the first global feature and a second global feature of the first face image.

In an example, the face recognition apparatus may obtain the final global feature of the first face image by cascading the first global feature and the second global feature of the first face image.

In an example, the face recognition apparatus may obtain the second global feature of the first face image based on the first local feature of the first face image. In other words, the second global feature of the first face image obtained based on the first local feature of the first face image which is not related to the second face image may be different from the first global feature of the first face image described above, and may be related to the first global feature of the first face image and the second face image. For example, the face recognition apparatus may obtain the second global feature of the first face image by inputting the first local feature $H^{A,i}$ of the first face image to the fully connected layer.

In operation 103, the face recognition apparatus may obtain a final global feature of the second face image based on the first global feature and a second global feature of the second face image.

In an example, the face recognition apparatus may obtain the final global feature of the second face image by cascading the first global feature and the second global feature of the second face image.

In an example, the face recognition apparatus may obtain the second global feature of the second face image based on the first local feature of the second face image. In other words, the second global feature of the second face image obtained based on the first local feature of the second face image which is not related to the first face image may be different from the first global feature of the second face image described above, and may be related to the first global feature and the second face image and the second face image. For example, the face recognition apparatus may obtain the second global feature of the second face image by inputting the first local feature $H^{B,i}$ of the second face image to the fully connected layer.

For example, operations 102 and 103 may be performed sequentially, in parallel, or in reverse. In operation 104, the face recognition apparatus may recognize the first face image and the second face image based on the final global feature of the first face image and the final global feature of the second face image.

For example, in operation 104, the face recognition apparatus may recognize (or authenticate) whether the first face image and the second face image indicate the same identity based on the final global feature of the first face image and the final global feature of the second face image according to a preset rule.

Figure 3:
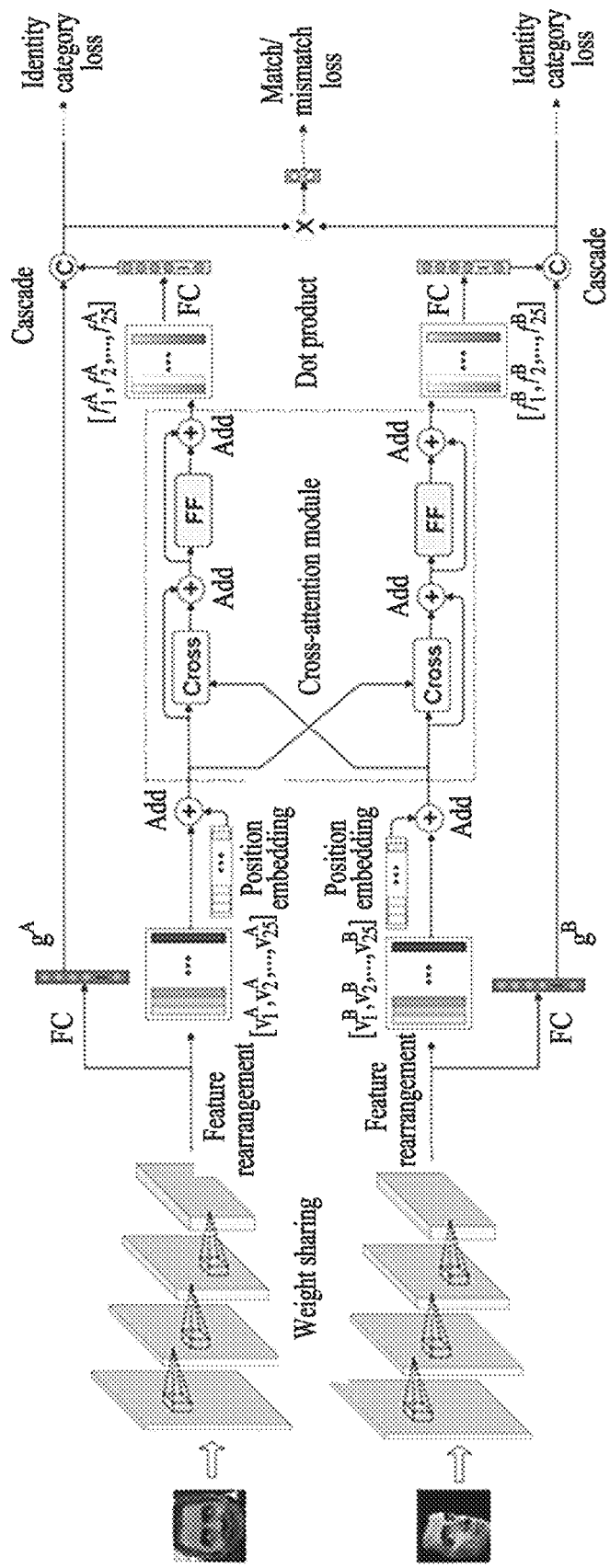
FIG. 3 illustrates an example of a face recognition method.

FIG. 3 illustrates an example of a face recognition method.

Referring to FIG. 3, for convenience of explanation, hereinafter, a first face image on an upper left side of FIG. 3 and a second face image on a lower left side of FIG. 3 may be referred to as a "first face image (or a face image A)" and a "second face image (or a face Image B)", respectively.

First, a first local feature of each of the first face image and the second image may be extracted through, for example, a convolutional network. FIG. 3 illustrates obtaining the first local feature of the first face image and the first local feature of the second face image through two identical networks, respectively, however, the first local feature of the first face image and the first local feature of the second face image may also be obtained individually through the same network.

Subsequently, a face recognition apparatus may obtain a second global feature $g^A$ of the first face image by inputting the first local feature of the first face image to a fully connected layer FC.

The face recognition apparatus may obtain a first local feature representation of the first face image in which position information is embedded, by performing feature rearrangement processing on a local feature of the first face image and performing a position embedding operation, and then may obtain a second local feature $[f_1^A, f_2^A, \ldots, f_{25}^A]$ of the first face image based on a cross-attention mechanism. The above process is similar to the above-described process of obtaining the second local feature, and accordingly further description thereof is not repeated herein.

The face recognition apparatus may obtain a first global feature of the first face image by inputting the second local feature of the first face image to the fully connected layer FC.

The face recognition apparatus may obtain a final global feature of the first face image by performing a cascade operation on the first global feature and the second global feature of the first face image using a cascade layer.

The process of obtaining the final global feature of the first face image has been described above with reference to FIG. 3.

A process in which the face recognition apparatus obtains a final global feature of the second face image in FIG. 3 is similar to a process in which the face recognition apparatus obtains a global feature of the first face image, and accordingly further description thereof is not repeated herein.

When the final global feature of the first face image and the final global feature of the second face image are obtained, the face recognition apparatus may determine whether the first face image and the second face image indicate the same identity based on the final global features.

Relevant parameters of a network that performs the face recognition method may be trained together using a binary entropy loss function and an additional angular margin loss function.

Specifically, a computing device of one or more embodiments may perform an element-wise multiplication on elements in final global features of an image pair for training, may perform binary prediction by inputting a result of the element-wise multiplication to a linear layer, and may determine whether the image pair comes from the same identity. The binary entropy loss function may be expressed as shown in Equation 3 below, for example.

$$L_1 = -\frac{1}{N}\sum_{j}[l_j\log(s_j) + (1-l_j)\log(1-s_j)] \quad \text{Equation 3}$$

In Equation 3 above, j denotes a sequence number of a sample pair, N denotes a number of image pairs in a small batch of training samples, $l_j$ denotes an actual label indicating whether an image pair belongs to the same identity, $l_j=1$ denotes a positive image pair, $l_j=0$ denotes a negative image pair, and $s_j$ denotes a prediction probability as an output of a linear layer.

The computing device may use the additional angular margin loss function as shown in Equation 4 below, for example, for identity classification.

$$L_2 = -\frac{1}{2N}\sum_{k}\log\frac{e^{s(\cos(\theta_{y_k}+m))}}{e^{s(\cos(\theta_{y_k}+m))} + \sum_{i=1,i\neq y_k}^{n}e^{s\cos\theta_i}} \quad \text{Equation 4}$$

In Equation 4 above, 2N denotes a number of image pairs in a small batch of training samples, θ denotes an angle between a feature and a corresponding weight, s denotes a size factor, m denotes a threshold factor, k denotes a sample sequence number, and $y_k$ denotes a truth-value sample sequence number.

The computing device may perform end-to-end training on the entire network using a function shown in Equation 5 below, for example.

$$\min(\alpha L_1 + L_2) \quad \text{Equation 5:}$$

In Equation 5 above, α denotes a coefficient for balancing of two functions $L_1$ and $L_2$. For example, α may be "10".

As described above, the face recognition apparatus of one or more embodiments may understand or determine a local correspondence relationship of a pair of face images based on a cross-attention mechanism without a face alignment module of a complex design, that is, without a need for alignment processing on a face.

Figure 4:
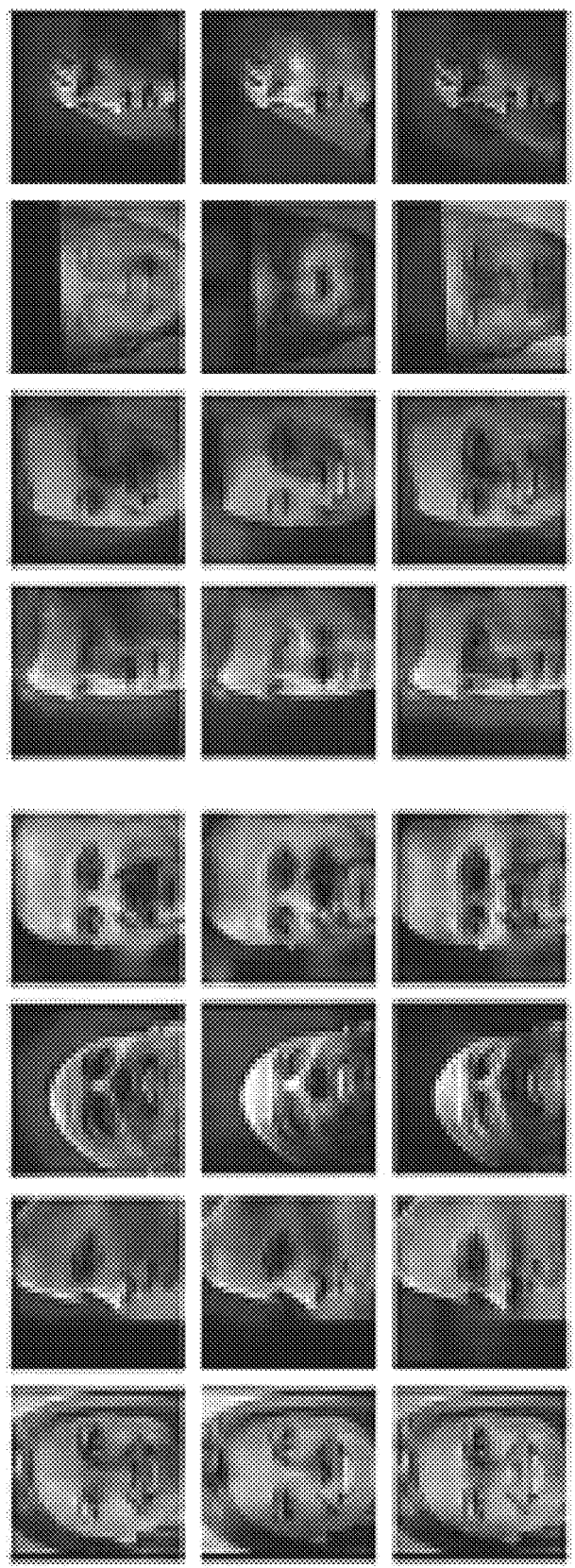
FIG. 4 illustrates an example of a visual reaction of a face image based on a baseline face recognition method, a self-attention face recognition method, and a face recognition method.

FIG. 4 illustrates an example of a visual reaction of a face image based on a baseline face recognition method, a self-attention face recognition method, and a face recognition method according to one or more embodiments.

Referring to FIG. 4, a first row shows a baseline-based feature response, a second row shows a self-attention-based feature response, and a last row shows a cross-attention-based feature response according one or more embodiments. In comparison to the first row and the second row, the face recognition method of one or more embodiments may obtain a relatively high feature response for most similar face portions of compared face image pairs. For example, in a left second face image pair, a response around eyes may be high, which may indicate that features around the eyes are similar. Through feature extraction and comparison in the above prominent regions, a face recognition apparatus according to one or more embodiments may more properly determine whether faces with different expressions or poses belong to the same identity. The face recognition apparatus of one or more embodiments may show a higher response even in similar face regions in the case of images indicating different identities, and accordingly an accuracy of face recognition may be increased by distinguishing different identities. On the contrary, visual reactions of face images based on other face recognition methods may not show the above correspondence relationship.

According to an example, the face recognition apparatus may calculate a pooling feature of a face image (e.g., an image A) based on a query vector (or a first local feature of a comparative image) of a comparative image (e.g., an image B), and the query vector of the comparative image (e.g., the image B) may guide an attention-weight calculation to focus on a feature region that is most similar to a comparative image pair. In the case of image pairs with different poses, lightings, or ages of even the same person, a feature response of a most similar face portion is higher. When a comparison between similar features in image pairs with different identities is emphasized, the face recognition apparatus of one or more embodiments may more accurately recognize the image pairs.

Even for images with a low similarity, compared to features in a background of the image A, a feature in a face region of the image B is more similar to a feature in a face region of the image A, which may lead to a higher response of features in the entire face region. That is, more attention may be paid to a comparison between face regions, excluding an influence of the background information.

The face recognition method has been described above with reference to FIGS. 1 through 4, and an example of a face recognition apparatus will be described below with reference to FIG. 5.

It will be understood, after an understanding of the present disclosure, that terms used below have the same or similar meanings as corresponding terms mentioned above.

Figure 5:
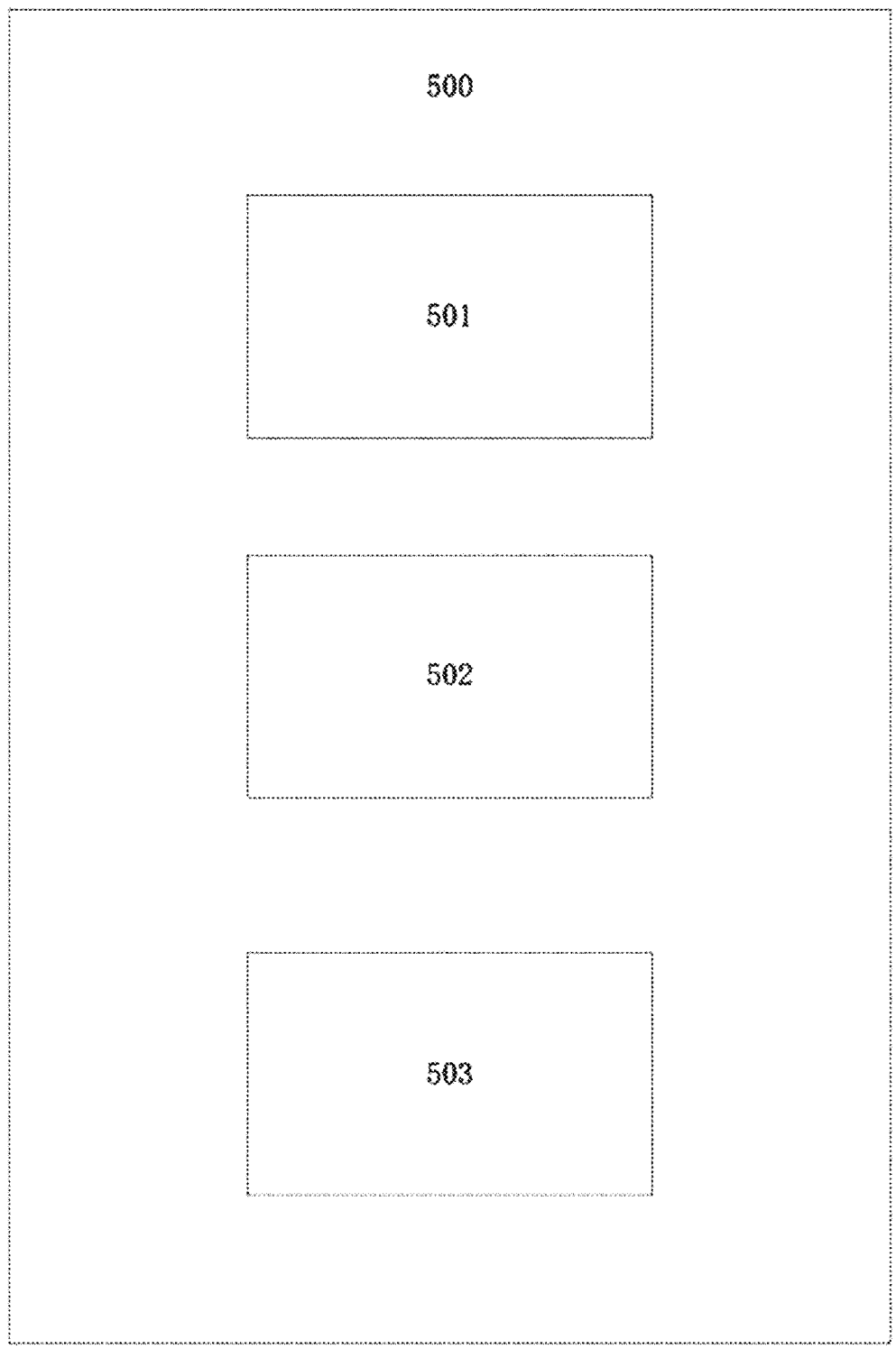
FIG. 5 illustrates an example of a face recognition apparatus.

FIG. 5 is a block diagram illustrating an example of a face recognition apparatus.

Referring to FIG. 5, the face recognition apparatus 500 may include a first global feature obtaining module 501, a final global feature obtaining module 502, and a recognition module 503. It will be understood, after an understanding of the present disclosure, that the face recognition apparatus 500 may further include other components, that at least one component of the face recognition apparatus 500 is combined into one component or that one component may be divided into a plurality of components, and that a component obtained after division or combination may realize a function of a component before division or combination.

In an example, the first global feature obtaining module 501 may be configured to obtain a first global feature of a first face image and a first global feature of a second face image based on a local feature of the first face image and a local feature of the second face image, respectively.

In an example, the first global feature obtaining module 501 may include a first face image first global feature obtaining module (not shown) configured to obtain the first global feature of the first face image, and a second face image first global feature obtaining module (not shown) configured to obtain the first global feature of the second face image.

In an example, the final global feature obtaining module 502 may be configured to obtain a final global feature of the first face image based on the first global feature and a second global feature of the first face image, and a final global feature of the second face image based on the first global feature and a second global feature of the second face image. The second global feature of the first face image may be obtained based on the local feature of the first face image, and the second global feature of the second face image may be obtained based on the local feature of the second face image.

In an example, the final global feature obtaining module 502 may include a first face image cascade layer (not shown) configured to obtain the final global feature of the first face image based on the first global feature and the second global feature of the first face image, and a second face image cascade layer (not shown) configured to obtain the final global feature of the second face image based on the first global feature and the second global feature of the second face image.

In an example, the first global feature obtaining module 501 may be configured to perform an attention pooling processing based on the local feature of the first face image and the local feature of the second face image, to obtain the first global feature of the first face image and the first global feature of the second face image, respectively.

In an example, the first global feature obtaining module 501 may include a first attention pooling module (not shown) configured to obtain a first attention pooling feature of the first face image with respect to the second face image by performing an attention pooling processing on the local features of the first face image using a cross-attention mechanism, and a second attention pooling module (not shown) configured to obtain a second attention pooling feature of the second face image with respect to the first face image by performing an attention pooling processing on the local features of the second face image using the cross-attention mechanism.

In an example, the face recognition apparatus 500 may further include a position information embedding module (not shown). The position information embedding module may be configured to embed position information in the local feature of the first face image to obtain the local feature of the first face image including the embedded position information, and embed position information in the local feature of the second face image to obtain the local feature of the second face image including the embedded position information.

In an example, the face recognition apparatus 500 may further include a feature rearrangement module (not shown). The feature rearrangement module may be configured to perform feature rearrangement on a first local feature of a face image. For example, features of a local feature map with a size of 5×5 may be rearranged as a local feature map with a size of 1×25.

In an example, the first global feature obtaining module 501 may be configured to perform an attention pooling processing on global features of the first face image in which position information is embedded and local features of the second face image in which position information is embedded.

In an example, the first global feature obtaining module 501 may include a cross-attention module (not shown). The cross-attention module may be configured to obtain a first query vector by multiplying the local feature of the second face image by a first query matrix corresponding to a query, obtain a first key vector by multiplying the local feature of the first face image by a first key matrix corresponding to a key, obtain a first value vector by multiplying the local feature of the first face image by a first value matrix corresponding to a value, and obtain an attention pooling feature of the first face image with respect to the second face image based on the obtained first query vector, first key vector, and first value vector. Also, the cross-attention module may be configured to obtain a second query vector by multiplying the local feature of the first face image by a second query matrix corresponding to a query, obtain a second key vector by multiplying the local feature of the second face image by a second key matrix corresponding to a key, obtain a second value vector by multiplying the local feature of the second face image by a second value matrix corresponding to a value, and obtain an attention pooling feature of the second face image with respect to the first face image based on the obtained second query vector, second key vector, and second value vector.

In an example, the cross-attention module may include a first cross-attention module configured to obtain the attention pooling feature of the first face image with respect to the second face image, and a second cross-attention module configured to obtain the attention pooling feature of the second face image with respect to the first face image.

In an example, the cross-attention module may include a multi-head attention layer. The multi-head attention layer may be configured to obtain an attention pooling feature of the first face image with respect to the second face image based on a first local feature of the first face image and a first local feature of the second image and obtain an attention pooling feature of the second face image with respect to the first face image based on the first local feature of the first face image and the first local feature of the second image.

In an example, the cross-attention module may include a residual connection and layer normalization (Add&Norm) layer, and a feed forward layer. Through the residual connection and layer normalization (Add&Norm) layer and the feed forward layer, a second local feature of the first face image may be obtained from the attention pooling feature of the first face image with respect to the second face image, and a second local feature of the second face image may be obtained from the attention pooling feature of the second face image with respect to the first face image.

In an example, the first global feature obtaining module 501 may further include a fully connected layer (not shown). The fully connected layer may be configured to obtain the first global feature of the first face image based on the second local feature of the first face image and obtain the first global feature of the second face image based on the second local feature of the second face image.

In an example, the face recognition apparatus 500 may further include a first local feature obtaining module (not shown). The first local feature obtaining module may be configured to obtain the first local feature of the first face image based on the first face image and obtain the first local feature of the second face image based on the second face image.

In an example, the face recognition apparatus 500 may further include a second global feature obtaining module (not shown). The second global feature obtaining module may be configured to the second global feature of the first face image based on the first local feature of the first face image and obtain the second global feature of the second face image based on the first local feature of the second face image. In an example, the second global feature obtaining module may be a fully connected layer.

According to an example, a non-transitory computer-readable storage medium for storing a computing program may be provided. The computing program may cause a processor to perform the face recognition method when executed by the processor.

According to an example, a data storage device may be provided. The data storage device may include a processor, and a memory configured to store a computing program. The computing program may cause the processor to perform the face recognition method when executed by the processor.

Figure 6:
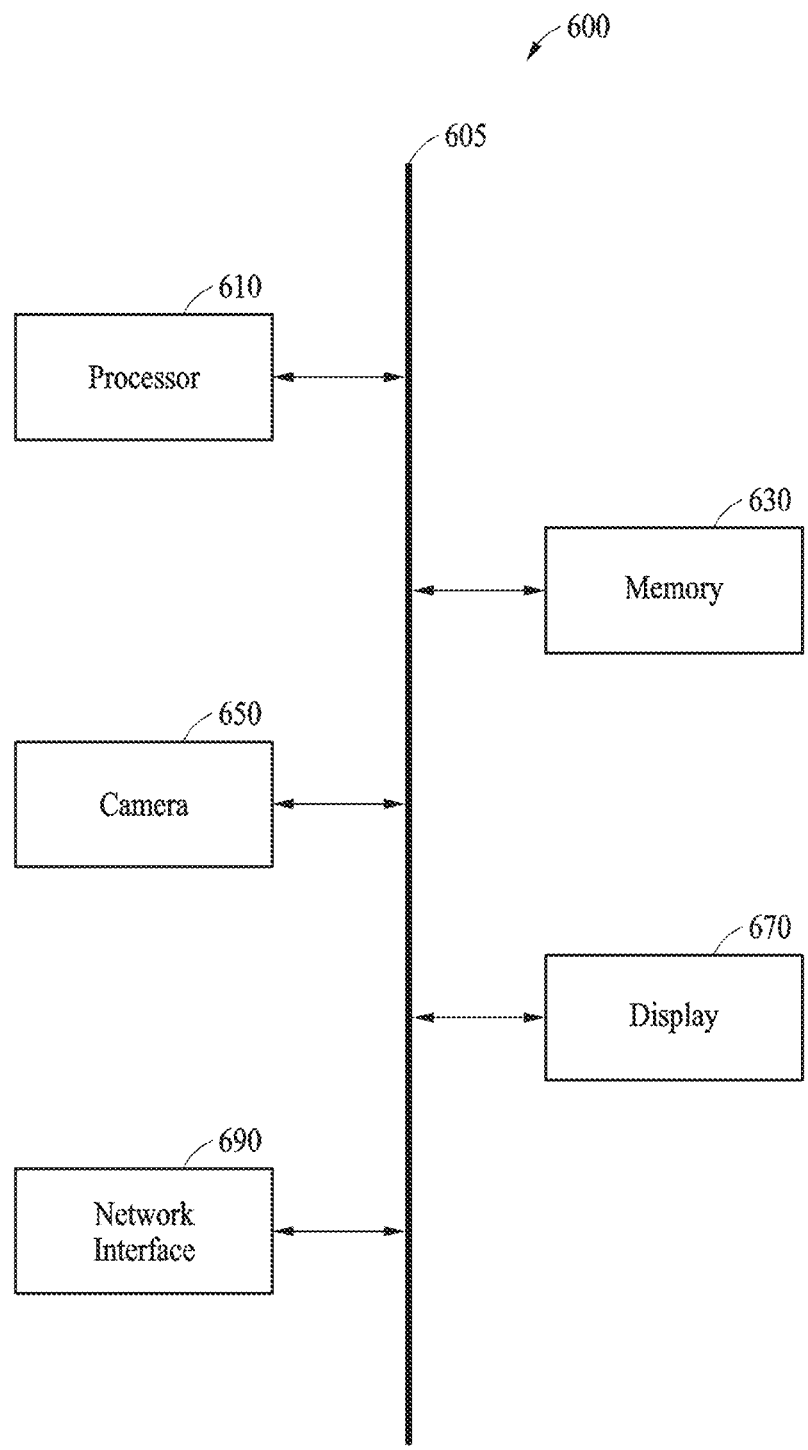
FIG. 6 illustrates an example of an electronic device.

FIG. 6 illustrates an example of an electronic device.

According to an example, an electronic device 600 may perform face recognition. The electronic device 600 may be, for example, a smartphone, a tablet personal computer (PC), or a wearable device, but is not limited thereto. The electronic device 600 may include a processor 610 (e.g., one or more processors), a memory 630 (e.g., one or more memories), a camera 650 (e.g., including one or more image sensors), a display 670, and a network interface 690. The processor 610, the memory 630, the camera 650, the display 670, and the network interface 690 may communicate with each other via a communication bus 605. According to an example, the electronic device 600 may be or include the face recognition apparatus 500 of FIG. 5.

The processor 610 in the electronic device 600 may execute instructions or functions to perform face authentication. For example, the processor 610 may execute instructions stored in the memory 630. The processor 610 may perform the above-described face recognition method or implement the above-described face recognition apparatus 500. The processor 610 may be, for example, an application processor 610, but is not limited thereto. According to an example, the processor 610 may include the first global feature obtaining module 501, the final global feature obtaining module 502, and the recognition module 503 of FIG. 5.

The processor 610 may be configured to perform one or more or all steps, operations, or methods described above with reference to FIGS. 1 through 5. For example, the processor 610 may obtain a first global feature of a first face image and a first global feature of a second face image based on a local feature of the first face image and a local feature of the second face image, respectively. The processor 610 may obtain a final global feature of the first face image based on the first global feature and a second global feature of the first face image, obtain a final global feature of the second face image based on the first global feature and a second global feature of the second face image, and recognize the first face image and the second face image based on the final global feature of the first face image and the final global feature of the second face image. The above description of the face recognition method or the above description of the face recognition apparatus may be applicable to an operation of the processor 610.

The memory 630 may store information to perform face recognition. The memory 630 may include a non-transitory computer-readable storage medium or a non-transitory computer-readable storage device. The memory 630 may store instructions executable by the processor 610 and information used to perform face recognition.

The camera 650 may obtain either one or both of a still image and a video image representing an object for face recognition. The camera 650 may obtain a first face image and/or a second face image.

The display 670 may display an image (e.g., a still image, a video image, etc.) obtained by the camera 650. For example, the processor 610 may receive the first face image and/or the second face image from the camera 650, and display the first face image and/or the second face image on the display 670.

The network interface 690 may allow the electronic device 600 to communicate with an external device (e.g., a server) through a wired or wireless network.

In an example, the face recognition apparatus 500 may be or be included in, for example, any one or any combination of a smartphone, a wearable device, a tablet computer, a netbook, a laptop, a desktop, a personal digital assistant (PDA), a set-top box, a home appliance, a door lock, a security checkpoint (e.g., a security checkpoint in an airport or a train station, etc.), an access control system of a place (e.g., an apartment, a building, etc.), an automated teller machine (ATM), a vehicle starter, and a server.

In an example, the first face image and the second face image may be individually collected or obtained by the same sensor (e.g., the same camera or the same image sensor). The examples are not limited thereto, and the first face image and the second face image may be individually collected or obtained by different sensors (e.g., different cameras or different image sensors).

The face recognition apparatuses, first global feature obtaining modules, final global feature obtaining modules, recognition modules, electronic devices, processors, memories, cameras, displays, network interfaces, communication buses, face recognition apparatus 500, first global feature obtaining module 501, final global feature obtaining module 502, recognition module 503, electronic device 600, processor 610, memory 630, camera 650, display 670, network interface 690, communication bus 605, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method with face recognition, the method comprising:
   determining a first global feature of a first face image and a first global feature of a second face image based on a local feature of the first face image and a local feature of the second face image, respectively;
   determining a final global feature of the first face image based on the first global feature of the first face image and a second global feature of the first face image;
   determining a final global feature of the second face image based on the first global feature and a second global feature of the second face image; and
   recognizing the first face image and the second face image based on the final global feature of the first face image and the final global feature of the second face image,
   wherein the second global feature of the first face image is determined based on the local feature of the first face image, and the second global feature of the second face image is determined based on the local feature of the second face image,
   wherein the determining of the first global feature of a first face image and the first global feature of a second face image comprises:
   determining a first attention pooling feature of the first face image with respect to the second face image and a second attention pooling feature of the second face image with respect to the first face image, based on the local feature of the first face image and the local feature of the second face image, respectively, using a multi-head attention mechanism;
determining the first global feature of the first face image based on the first attention pooling feature; and
determining the first global feature of the second face image based on the second attention pooling feature.

2. The method of claim 1, wherein the determining of the first global feature of the first face image and the first global feature of the second face image based on the local feature of the first face image and the local feature of the second face image, respectively, comprises performing an attention pooling processing based on the local feature of the first face image and the local feature of the second face image to determine the first global feature of the first face image and the first feature of the second face image, respectively.

3. The method of claim 2, wherein
the local feature of the first face image is a local feature of the first face image in which position information is embedded, and
the local feature of the second face image is a local feature of the second face image in which position information is embedded.

4. The method of claim 1, wherein the determining of the first attention pooling feature of the first face image with respect to the second face image and the second attention pooling feature of the second face image with respect to the first face image using the multi-head attention mechanism, based on the local feature of the first face image and the local feature of the second face image comprises:
determining a first query vector by multiplying the local feature of the second face image by a first query matrix corresponding to a query, determining a first key vector by multiplying the local feature of the first face image by a first key matrix corresponding to a key, determining a first value vector by multiplying the local feature of the first face image by a first value matrix corresponding to a value, and determining an attention pooling feature of the first face image with respect to the second face image based on the determined first query vector, the determined first key vector and the determined first value vector; and
determining a second query vector by multiplying the local feature of the first face image by a second query matrix corresponding to a query, determining a second key vector by multiplying the local feature of the second face image by a second key matrix corresponding to a key, determining a second value vector by multiplying the local feature of the second face image by a second value matrix corresponding to a value, and determining the second attention pooling feature of the second face image with respect to the first face image based on the determined second query vector, the determined second key vector and the determined second value vector.

5. The method of claim 1, wherein the determining of the first global feature of the first face image and the first global feature of the second face image comprises determining the first global feature of the first face image and the first global feature of the second face image, respectively, using a same network or different networks.

6. A non-transitory computer-readable storage medium storing instructions that, when executed by one or more processors, configure the one or more processors to perform the method of claim 1.

7. An apparatus with face recognition, the apparatus comprising:
one or more processors comprising:
a first global feature obtaining module configured to determine a first global feature of a first face image and a first global feature of a second face image based on a local feature of the first face image and a local feature of the second face image, respectively;
a final global feature obtaining module configured to determine a final global feature of the first face image based on the first global feature and a second global feature of the first face image and determine a final global feature of the second face image based on the first global feature and a second global feature of the second face image; and
a recognition module configured to recognize the first face image and the second face image based on the final global feature of the first face image and the final global feature of the second face image,
wherein the second global feature of the first face image is determined based on the local feature of the first face image, and the second global feature of the second face image is determined based on the local feature of the second face image,
wherein, for the determining of the first global feature of the first face image and the first global feature of the second face image, the first global feature obtaining module is configured to:
determine a first attention pooling feature of the first face image with respect to the second face image and a second attention pooling feature of the second face image with respect to the first face image, based on the local feature of the first face image and the local feature of the second face image, respectively, using a multi-head attention mechanism;
determine the first global feature of the first face image based on the first attention pooling feature; and
determine the first global feature of the second face image based on the second attention pooling feature.

8. The apparatus of claim 7, wherein, for the determining of the first global feature of the first face image and the first global feature of the second face image, the first global feature obtaining module is configured to perform an attention pooling processing based on the local feature of the first face image and the local feature of the second face image to determine the first global feature of the first face image and the first global feature of the second face image, respectively.

9. The apparatus of claim 8, wherein
the local feature of the first face image is a local feature of the first face image in which position information is embedded, and
the local feature of the second face image is a local feature of the second face image in which position information is embedded.

10. The apparatus of claim 7, wherein
the first global feature obtaining module comprises a cross-attention module, and
for the determining of the first attention pooling feature of the first face image and the second attention pooling feature of the second face image, the cross-attention module is configured to:
determine a first query vector by multiplying the local feature of the second face image by a first query matrix corresponding to a query, determine a first key vector by multiplying the local feature of the first face image by a first key matrix corresponding to a key, determine a first value vector by multiplying the local feature of the first face image by a first value matrix corresponding to a value, and determine the first attention pooling feature of the first face image with respect to the second face image based on the determined first query vector, the determined first key vector and the determined first value vector; and determine a second query vector by multiplying the local feature of the first face image by a second query matrix corresponding to a query, determine a second key vector by multiplying the local feature of the second face image by a second key matrix corresponding to a key, determine a second value vector by multiplying the local feature of the second face image by a second value matrix corresponding to a value, and determine the second attention pooling feature of the second face image with respect to the first face image based on the determined second query vector, the determined second key vector and the determined second value vector.

11. The apparatus of claim 7, wherein the first global feature obtaining module comprises:
a first face image first global feature determining module configured to determine the first global feature of the first face image; and
a second face image first global feature determining module configured to determine the first global feature of the second face image.

12. An electronic device comprising:
one or more processors configured to:
determine a first global feature of a first face image and a first global feature of a second face image based on a local feature of the first face image and a local feature of the second face image, respectively,
determine a final global feature of the first face image based on the first global feature and a second global feature of the first face image,
determine a final global feature of the second face image based on the first global feature and a second global feature of the second face image, and
recognize the first face image and the second face image based on the final global feature of the first face image and the final global feature of the second face image,
wherein the second global feature of the first face image is determined based on the local feature of the first face image, and the second global feature of the second face image is determined based on the local feature of the second face image,
wherein the one or more processors are configured to:
determine a first attention pooling feature of the first face image with respect to the second face image and a second attention pooling feature of the second face image with respect to the first face image, based on the local feature of the first face image and the local feature of the second face image, respectively, using a multi-head attention mechanism;
determine the first global feature of the first face image based on the first attention pooling feature; and
determine the second global feature of the second face image based on the second attention pooling feature.

13. The electronic device of claim 12, wherein, for the determining of the first global feature of the first face image and the first global feature of the second face image, the one or more processors are configured to perform an attention pooling processing based on the local feature of the first face image and the local feature of the second face image to determine the first global feature of the first face image and the first global feature of the second face image, respectively.

14. The electronic device of claim 13, wherein
the local feature of the first face image is a local feature of the first face image in which position information is embedded, and
the local feature of the second face image is a local feature of the second face image in which position information is embedded.

15. The electronic device of claim 12, wherein, for the determining of the first attention pooling feature of the first face image and the second attention pooling feature of the second face image, the one or more processors are configured to:
determine a first query vector by multiplying the local feature of the second face image by a first query matrix corresponding to a query, determine a first key vector by multiplying the local feature of the first face image by a first key matrix corresponding to a key, determine a first value vector by multiplying the local feature of the first face image by a first value matrix corresponding to a value, and determine the first attention pooling feature of the first face image with respect to the second face image based on the determined first query vector, the determined first key vector and the determined first value vector; and
determine a second query vector by multiplying the local feature of the first face image by a second query matrix corresponding to a query, determine a second key vector by multiplying the local feature of the second face image by a second key matrix corresponding to a key, determine a second value vector by multiplying the local feature of the second face image by a second value matrix corresponding to a value, and determine the second attention pooling feature of the second face image with respect to the first face image based on the determined second query vector, the determined second key vector and the determined second value vector.

16. The apparatus of claim 12, further comprising a memory storing instructions that, when executed by the one or more processors, configure the one or more processors to perform the determining of the first global feature of the first face image and the first global feature of the second face image, the determining of the final global feature of the first face image, the determining of the final global feature of the second face image, and the recognizing of the first face image and the second face image.

* * * * *